United States Patent
Iguchi et al.

(10) Patent No.: US 12,094,658 B2
(45) Date of Patent: Sep. 17, 2024

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 177 days.

(21) Appl. No.: 17/748,482

(22) Filed: May 19, 2022

(65) Prior Publication Data
US 2022/0384111 A1 Dec. 1, 2022

(30) Foreign Application Priority Data
May 26, 2021 (JP) ................. 2021-088544

(51) Int. Cl.
*H01G 4/12* (2006.01)
*C04B 35/468* (2006.01)
*H01G 4/008* (2006.01)
*H01G 4/012* (2006.01)
*H01G 4/30* (2006.01)

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/3206* (2013.01)

(58) Field of Classification Search
CPC ...... H01G 4/1227; H01G 4/008; H01G 4/012; H01G 4/30; C04B 35/4682; C04B 2235/3206
See application file for complete search history.

(56) References Cited

U.S. PATENT DOCUMENTS

| | | | | |
|---|---|---|---|---|
| 2002/0013213 A1* | 1/2002 | Sato | ...................... | H01G 4/1227 501/139 |
| 2011/0274614 A1* | 11/2011 | Lamminmaki | ...... | C01G 23/005 423/598 |
| 2012/0162858 A1 | 6/2012 | Tanaka et al. | | |
| 2017/0186536 A1* | 6/2017 | Sato | ................... | C04B 35/6342 |
| 2021/0202171 A1* | 7/2021 | Tsutsui | .................. | H01G 4/012 |
| 2021/0202177 A1* | 7/2021 | Kurosu | ............... | H01G 4/1218 |

(Continued)

FOREIGN PATENT DOCUMENTS

| JP | H11-45617 A | 2/1999 |
|---|---|---|
| JP | 2002-270458 A | 9/2002 |

(Continued)

OTHER PUBLICATIONS

Zhen et al., "Ba0.6Sr0.4TiO3 Ceramics Prepared by Different MgO-adding Processes and its Properties," Electronic Components and Materials, 2009, vol. 28, No. 4, pp. 7-10.

(Continued)

*Primary Examiner* — Michael P McFadden
(74) *Attorney, Agent, or Firm* — Oliff PLC

(57) ABSTRACT

A dielectric composition includes dielectric particles and first segregations. The dielectric particles each include a perovskite compound represented by $ABO_3$ as a main component. The first segregations each include at least Ba, V, and O. A molar ratio (Ba/Ti) of Ba to Ti detected in the first segregations is 1.20 or more.

18 Claims, 2 Drawing Sheets

(56) References Cited

U.S. PATENT DOCUMENTS

Figure 1:
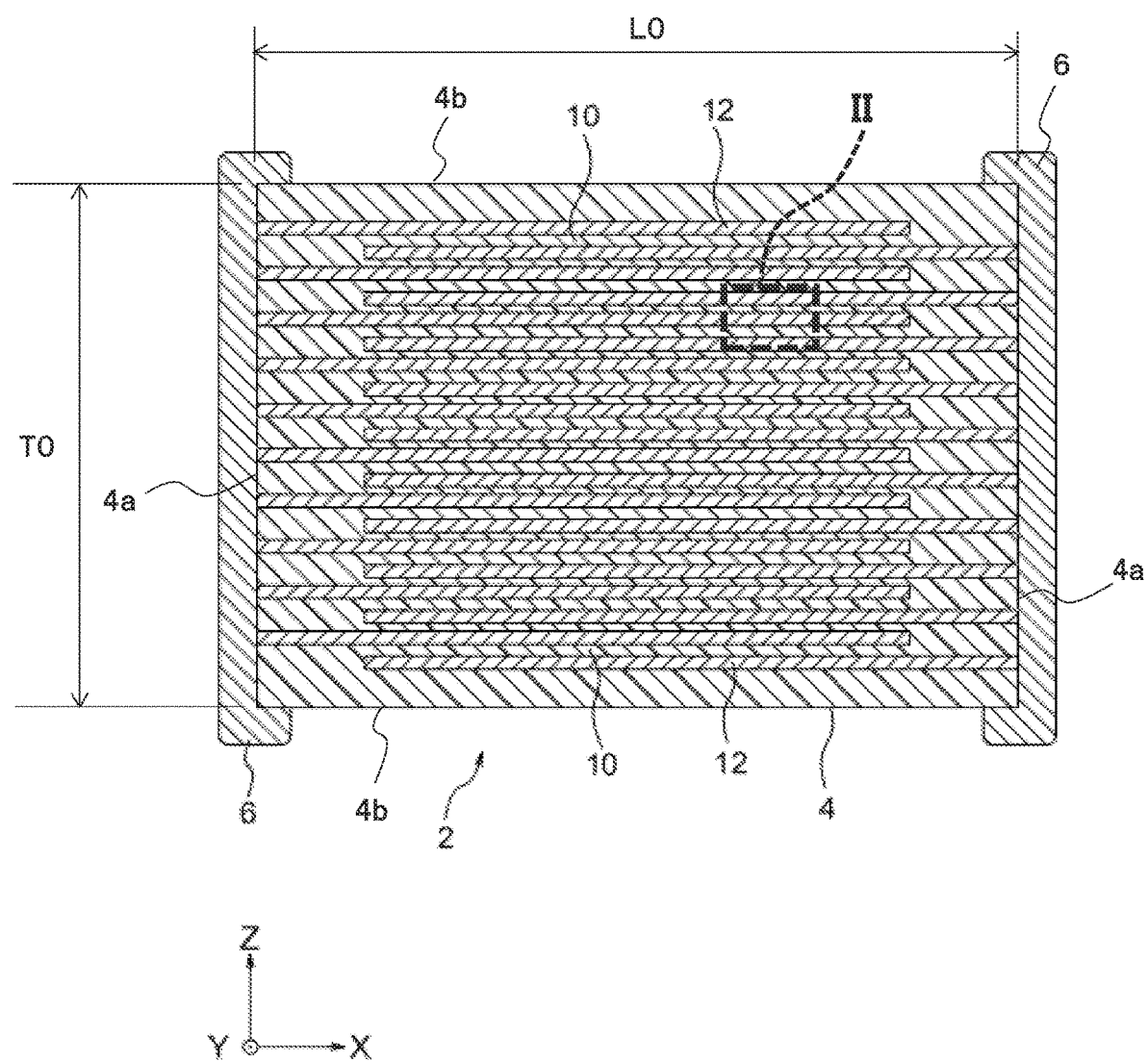

| | | | |
|---|---|---|---|
| 2021/0202178 A1* | 7/2021 | Kurosu | H01G 4/008 |
| 2021/0202179 A1* | 7/2021 | Saito | H01G 4/1218 |
| 2021/0202180 A1* | 7/2021 | Fukunaga | H01G 4/1209 |
| 2021/0202181 A1* | 7/2021 | Wakashima | H01G 4/30 |

FOREIGN PATENT DOCUMENTS

| | | | | |
|---|---|---|---|---|
| JP | 2013-012418 A | | 1/2013 | |
| JP | 2019-176026 A | | 10/2019 | |
| WO | WO-2004092071 A1 | * | 10/2004 | C01G 23/006 |

OTHER PUBLICATIONS

Oct. 27, 2023 Office Action issued in Chinese Patent Application No. 202210544927.6.

Dong Min et al., "Research on Hydrothermal Synthesis of Mg-doped Barium Titanate Powder and Electric Properties", Electronic Components & Materials, vol. 24, (2005), No. 12, pp. 1-3.

Li Yanxia et al., "Study on reduction-resistant properties of Mg doped barium titanate", Journal of the Chinese Ceramic Society, vol. 32 No. 6, (2004), pp. 763-766.

\* cited by examiner

DIELECTRIC COMPOSITION AND MULTILAYER CERAMIC ELECTRONIC DEVICE

BACKGROUND OF THE INVENTION

The present invention relates to a dielectric composition and a multilayer ceramic electronic device including the dielectric composition.

As shown in Patent Document 1, a multilayer ceramic electronic device formed by alternately laminating ceramic layers composed of a dielectric composition and internal electrode layers is known. The multilayer ceramic electronic device has differences in characteristics, such as shrinkage factor and linear expansion coefficient, between the ceramic layers and the internal electrode layers. In the multilayer ceramic electronic device, structural defects, such as cracks and delamination, occur due to the differences in characteristics, and the durability in a high-temperature and high-humidity environment may decrease.

Patent Document 1: JP2013012418 (A)

BRIEF SUMMARY OF THE INVENTION

The present invention has been achieved under such circumstances. It is an object of the present invention to provide a dielectric composition and a multilayer ceramic electronic device having an excellent durability for a high-temperature and high-humidity environment.

To achieve the above object, a dielectric composition according to the present invention comprises:

dielectric particles each including a perovskite compound represented by $ABO_3$ as a main component; and first segregations each including at least Ba, V, and O, wherein a molar ratio (Ba/Ti) of Ba to Ti detected in the first segregations is 1.20 or more.

The dielectric composition according to the present invention having the above-mentioned features is applicable to multilayer ceramic electronic devices. As a result of diligent studies, the inventors of the present invention have found that a multilayer ceramic electronic device including the above-mentioned dielectric composition exhibits an excellent durability in a high-temperature and high-humidity environment.

Preferably, an average particle size of the first segregations is 0.2 μm or more and 2.0 μm or less.

Preferably, the dielectric composition further comprises a second segregation containing Mg.

Preferably, the dielectric composition further comprises a third segregation, and the third segregation comprises a Ba—Ti—Si—O based composite oxide.

Preferably, the perovskite compound comprises barium titanate.

To achieve the above object, a multilayer ceramic electronic device according to the present invention comprises an element body formed by alternately laminating a ceramic layer including a perovskite compound represented by $ABO_3$ as a main component and an internal electrode layer containing Ni, wherein the ceramic layer includes first segregations each containing at least Ba, V, and O, and a molar ratio (Ba/Ti) of Ba to Ti detected in the first segregations is 1.20 or more.

As a result of diligent studies, the inventors of the present invention have found that the multilayer ceramic electronic device having the above-mentioned features improves the durability for a high-temperature and high-humidity environment.

Preferably, the first segregations are present so as to directly contact with the internal electrode layer in a boundary between the ceramic layer and the internal electrode layer. When the first segregations containing V are present in the boundary, the joint strength between the ceramic layer and the internal electrode is considered to improve, and the durability for a high-temperature and high-humidity environment is further improved.

Preferably, the number of first segregations contained in a unit length of the boundary is 0.004 pieces/μm or more.

Preferably, a ratio of an average particle size of the first segregations to an average thickness of the internal electrode layer is 0.50 or more.

In the multilayer ceramic electronic device, preferably, the ceramic layer further includes a second segregation containing Mg. Preferably, the ceramic layer further includes a third segregation, and the third segregation comprises a Ba—Ti—Si—O based composite oxide. When the above-mentioned second segregation and/or third segregation are/is present in the ceramic layer, the sintering density of the element body can be further improved, and the durability for a high-temperature and high-humidity environment is further improved.

In the multilayer ceramic electronic device, preferably, the perovskite compound comprises barium titanate.

BRIEF DESCRIPTION OF THE DRAWING(S)

Figure 2:
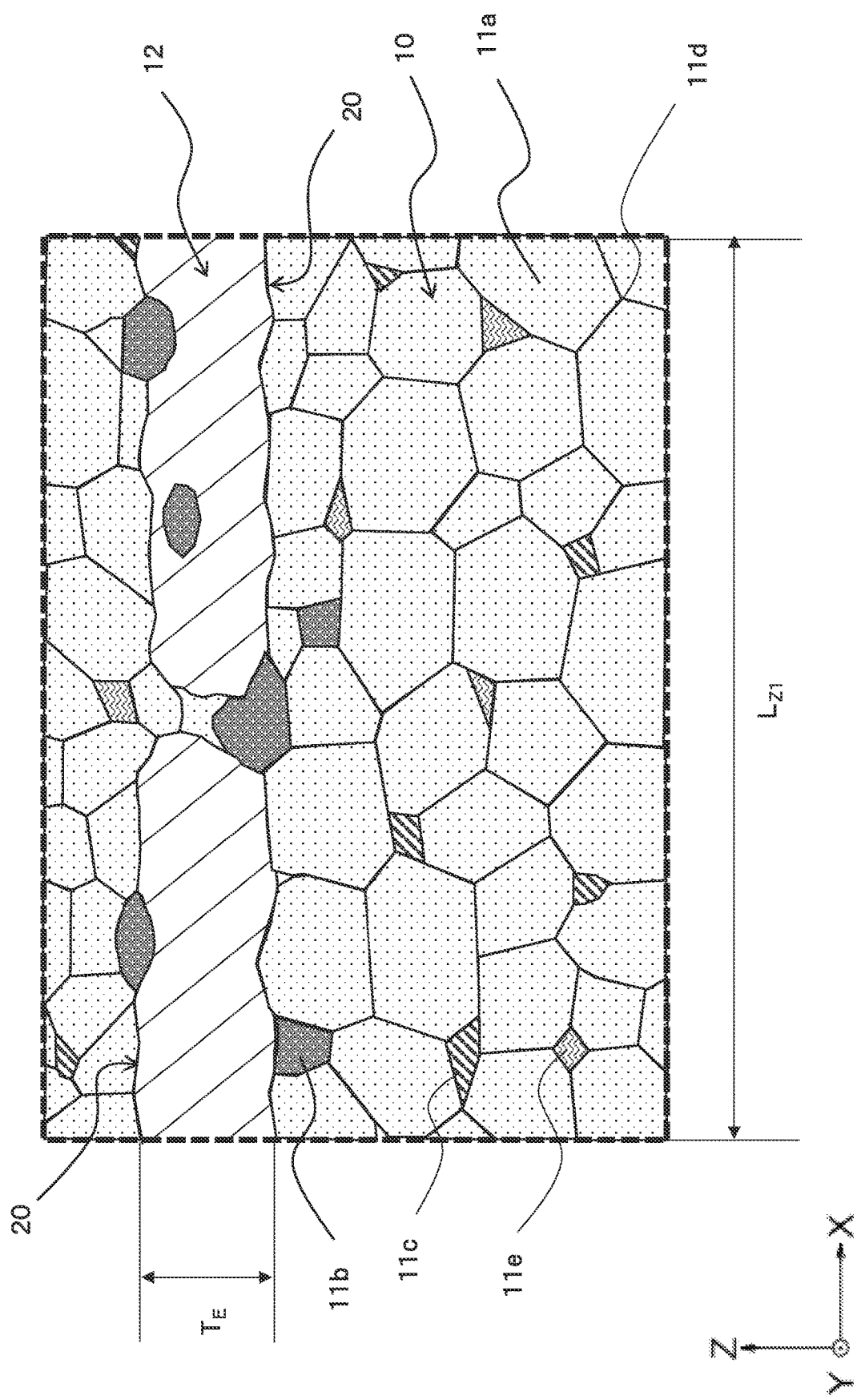

FIG. 1 is a schematic view illustrating a cross section of a multilayer ceramic capacitor according to an embodiment; and FIG. 2 is an enlarged cross-sectional view of the region II shown in FIG. 1.

DETAILED DESCRIPTION OF THE INVENTION

In the present embodiment, a multilayer ceramic capacitor 2 shown in FIG. 1 is described as an example of a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The average thickness (interlayer thickness) per layer of the ceramic layers 10 is not limited and can be, for example, 100 μm or less (preferably, 30 μm or less). The lamination number of ceramic layers 10 is determined based on desired characteristics and is not limited. For example, the lamination number of ceramic layers 10 can be 20 or more, preferably 50 or more.

Meanwhile, the internal electrode layers 12 are laminated between the ceramic layers 10 and the lamination number of internal electrode layers 12 is determined based on the lamination number of ceramic layers 10. The average thickness $T_E$ per layer of the internal electrode layers 12 is not limited and can be, for example, 3.0 μm or less. The average thickness of the ceramic layers 10 and the average thickness $T_E$ of the internal electrode layers 12 are calculated by observing a cross section as shown in FIG. 1 using a metallurgical microscope and measuring the thickness of each layer (10, 12) at five points or more.

The internal electrode layers 12 are laminated so that their ends on one side are alternately exposed to two end surfaces 4a of the element body 4 facing each other in the X-axis direction. Then, the pair of external electrodes 6 is formed on the end surfaces 4a of the element body 4 and electrically connected to the exposed ends of the internal electrode layers 12 alternately arranged. Since the external electrodes 6 are formed in such a manner, a capacitor circuit is formed by the external electrodes 6 and the internal electrode layers 12.

As shown in FIG. 1, each of the external electrodes 6 integrally includes an end surface part formed on the end surface 4a of the element body 4 and extension parts formed at an end in the X-axis direction on each of the side surfaces 4b of the element body 4. That is, each of the external electrodes 6 is formed so as to range from the end surface 4a to the side surfaces 4b of the element body 4. The external electrodes 6 are insulated so as not to contact with each other in the X-axis direction.

Note that, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

The external electrodes 6 can include a baked electrode layer, a resin electrode layer, a plating electrode layer, or the like and may be composed of a single electrode layer or a plurality of laminated electrode layers. For example, the external electrode 6 can have a triple-layer structure of a baked electrode layer—a Ni plating layer—a Sn plating layer (laminated in this order). In this case, the Sn plating layer is located on the outermost surface of the external electrode 6, and the solder wettability of the external electrode 6 is thus favorable.

Next, the details of the components and the internal texture of the ceramic layers 10 and the internal electrode layers 12 are explained.

The ceramic layers 10 are composed of a dielectric composition including a perovskite compound represented by a general formula of $ABO_3$ as a main component. Here, the main component of the ceramic layers 10 (the main component of the dielectric composition) means a component occupying 80 mol % or more of the ceramic layers 10.

In the present embodiment, the perovskite compound (main component) is preferably barium titanate (BT). This barium titanate may be represented by a composition formula of $(Ba_{(1-a-b)} Sr_a Ca_b)_m(Ti_{(1-c-d)} Zr_c Hf_d)O_3$.

In the composition formula, each of a, b, c, d, and m is an elemental ratio, and each elemental ratio is not limited and can be determined within a known range. For example, "m" indicates an elemental ratio of the A-site to the B-site and can normally be 1.0-1.1. "a" indicates an elemental ratio of Sr in the A-site, and "b" indicates an elemental ratio of Ca in the A-site. In the present embodiment, $0 \leq a+b \leq 0.1$ is preferably satisfied. "c" indicates an elemental ratio of Zr in the B-site, and "d" indicates an elemental ratio of Hf in the B-site. In the present embodiment, $0 \leq c+d \leq 0.15$ is preferably satisfied. The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, rare earth element compounds, Si compounds, Li compounds, B compounds, V compounds, Al compounds, and Ca compounds. There is no limit to the type, combination, or addition amount of the sub-components.

Meanwhile, the internal electrode layers 12 are made of a conductive material and include at least Ni. Specifically, the conductive material of the internal electrode layers 12 is preferably pure Ni or a Ni alloy, and a content rate of Ni in the internal electrode layers 12 is more preferably 85 wt % or more. When the conductive material is a Ni alloy, one or more internal-electrode sub-components selected from Mn, Cu, Cr, etc. may be contained.

In addition to the conductive material, as an inhibitor, the internal electrode layers 12 may contain particles of a perovskite compound having the same composition as the main component of the ceramic layers 10 and may contain particles of first segregations 11b mentioned below. In addition, the internal electrode layers 12 may contain a trace amount (e.g., about 0.1 mass % or less) of non-metal elements, such as S and P, and may contain voids. As mentioned above, when the internal electrode layers 12 contain non-metal components, such as inhibitor particles, particles of the first segregations 11b, and voids, the internal electrode layers 12 may have disconnected parts where an electrode (conductive material) is not present due to the non-metal components.

The component compositions of the ceramic layers 10 and the internal electrode layers 12 are analyzed by inductively coupled plasma emission spectroscopy (ICP), laser ablation ICP mass analysis (LA-ICP-MS), fluorescent X-ray analysis (XRF), energy dispersive X-ray analysis (EDX), electron beam microanalyzer (EPMA) equipped with wavelength dispersive X-ray spectroscope (WDS), or the like.

The ceramic layers 10 containing the above-mentioned components have an internal texture as shown in FIG. 2 and include dielectric particles 11a (parent phases), segregation phases (11b, 11c, 11e) having predetermined characteristics, and grain boundaries 11d located between the dielectric particles 11a.

The dielectric particles 11a are composed of the main component (perovskite compound) of the ceramic layers 10 mentioned above. In addition to the main component, when the ceramic layers 10 include sub-components, the sub-components may be solid-soluted in the dielectric particles 11a. The dielectric particles 11a may have a core-shell structure. The dielectric particles 11a can have an average particle size of 0.05 μm to 2 μm and preferably have an average particle size of 0.1 µm to 1 µm. The average particle size can be measured by observing a cross section of the ceramic layers 10 as shown in FIG. 2 using a scanning electron microscope (SEM), a scanning transmission electron microscope (STEM), or the like and performing an image analysis of the obtained cross-sectional photograph. For example, an average particle size of the dielectric particles 11a is calculated by measuring equivalent circle diameters of at least 100 or more dielectric particles 11a.

As shown in FIG. 2, the ceramic layers 10 according to the present embodiment include first segregations 11b. The first segregations 11b are phases of a composite oxide whose concentration of V is higher than that in the dielectric particles 11a.

The first segregations 11b include at least V, Ba, and O. In addition to these elements, the first segregations 11b may include constituent elements of the ceramic layers 10 (elements that can be contained in the main component, such as Sr, Ca, Ti, Zr, and Hf, sub-component elements, etc.). Assuming that the total content of elements excluding oxygen contained in the first segregations 11b is 100 mol, a content rate of V in the first segregations 21 is preferably 5 mol % or more and is more preferably 10 mol % to 45 mol %. The detailed composition of the first segregations 11b is not limited, but is preferably, for example, $Ba_3(VO_4)_2$ (trigonal).

Preferably, the first segregations 11b are determined by a combination of mapping analysis and point analysis with EDX or WDS. For example, in a cross section of the element body 4 as shown in FIG. 2, a mapping analysis is performed to determine regions where V is segregated from a V mapping image. Here, the "regions where V is segregated" means regions whose V concentration is higher than that in the dielectric particles 11a and can be determined from the V mapping image. A point analysis is performed in each of the regions where V is segregated. When a molar ratio (Ba/Ti ratio) of Ba to Ti detected in this analysis is 1.20 or more, the measured V segregation regions are considered to be the first segregations 11b. The measurement conditions, such as measurement visual field and resolution, in the mapping analysis and the point analysis are not limited and appropriately determined so that segregation analysis can be performed.

In the above-mentioned measurement, the Ba/Ti ratio is defined so as to accurately determine the presence or absence of Ba in the V segregations. In the component analysis (point analysis) with EDX or WDS, characteristic X-rays are generated in a wider range than the irradiation area of the electron beam, so that the dielectric particles 11a existing around the first segregations 11b may affect the component analysis of segregations. That is, even if Ba or Ti does not actually exist at the V segregation locations, the peak of Ba or Ti may be detected. In the dielectric particles 11a composed of barium titanate, however, the upper limit of m is about 1.1 as mentioned above, and the Ba/Ti ratio is also 1.1 or less. Thus, when the Ba/Ti ratio at the V segregation locations is 1.2 or more, which is higher than that in the dielectric particles 11a, it can be determined that Ba exists at the V segregation locations. For this reason, in the present embodiment, the presence or absence of the first segregations 11b is determined based on the V mapping and the Ba/Ti ratio. The Ba/Ti ratio in the first segregations 11b has no upper limit.

In the present embodiment, as shown in FIG. 2, the first segregations 11b exist in boundaries 20 between the ceramic layers 10 and the internal electrode layers 12. The "first segregations 11b exist in boundaries 20" means that the first segregations 11b are in direct contact with both of the dielectric particles 11a of the ceramic layers 10 and the internal electrode layers 12. For example, the first segregations 11b may be present inside the ceramic layers 10 so as to be in contact with the internal electrode layers 12. Moreover, the first segregations 11b may be present by biting into the internal electrode layers 12 rather than the ceramic layers 10. Instead of the boundaries 20, a part of the first segregations 11b may be present inside the ceramic layers 10 without being in contact with the internal electrode layers 12.

The first segregations 11b can have an average particle size D1 of 3.5 µm or less and preferably have an average particle size D1 of 0.2 µm to 2.0 µm. A ratio ($D1/T_E$) of an average particle size D1 of the first segregations 11b to an average thickness $T_E$ of the internal electrode layers 12 can be 0.30 or more and is preferably 0.50 or more and is more preferably in the range of 0.50-1.50. As mentioned below, the first segregations 11b are formed by adding first segregation raw materials to an internal electrode paste, and it is considered that the first segregations 11b are easily formed in the boundaries 20 by controlling the $D1/T_E$ within the above-mentioned range. The average particle size of the first segregations 11b is calculated by determining at least five first segregations 11b in the above-mentioned manner and thereafter measuring equivalent circle diameters of the first segregations 11b with image analysis.

The number N1 of first segregations 11b contained in a unit length of the boundaries 20 can be 0.001 pieces/µm or more and is preferably 0.004 pieces/µm or more and is more preferably 0.004 pieces/µm to 0.055 pieces/µm. The number N1 in a unit length is calculated by observing a cross section of the element body 4 in a plurality of visual fields with SEM, STEM, or the like and counting the number of first segregations 11b existing at least in 100 µm or more in total of the boundaries 20. That is, the number N1 can be represented by the number $N_L$ of measured first segregations 11b/the total length $L_Z$ of analyzed boundaries 20.

The boundaries 20 are meandering or partially disconnected when observed at a high magnification with SEM, STEM, or the like. In the measurement of the number N1, it is not necessary to accurately measure meandering parts, disconnected parts, and the like of the boundaries 20 so as to calculate the total length $L_Z$, and the width of the cross-sectional photograph is regarded as the length of the boundaries 20. For example, as shown in FIG. 2, a cross-sectional photograph is taken so that the internal electrode layers 12 and one side of the cross-sectional photograph are substantially parallel to each other, and a width $L_{Z1}$ of the cross-sectional photograph in the X-axis direction is regarded as a length of the boundaries 20 in this observation visual field.

In addition to the first segregations 11b, preferably, the ceramic layers 10 according to the present embodiment include second segregations 11c containing Mg. The second segregations 11c are phases of a composite oxide whose Mg concentration is higher than that in the dielectric particles 11a. In addition to Mg, the second segregations 11c may contain constituent elements of the ceramic layers 10. In particular, preferably, the second segregations 11c contain O, Ba, and Ti. The detailed composition of the second segregations 11c is not limited, but the second segregations 11c are preferably, for example, $Ba(Ti_{(1-X)},Mg_X)O_3$ (hexagonal). In this composition formula, x represents an atomic number ratio of Mg. The numerical range of x is not limited and can be, for example, 0.02 to 0.30. The atomic number ratio of oxygen in the above-mentioned composition formula is 3.0, but may deviate slightly.

The second segregations 11c can be determined by a mapping analysis with EDX or WDS. At this time, the mapping analysis is performed in the same manner as the analysis of the first segregations 11b. Then, regions whose Mg concentration is higher than that in the dielectric particles 11a are extracted from a Mg mapping image obtained by the mapping analysis, and these regions are determined as the second segregations 11c.

The second segregations 11c can have an average particle size of 2 μm or less and preferably have an average particle size of 0.01 μm to 1 μm. The average particle size of the second segregations 11c is measured in the same manner as the average particle size of the first segregations 11b. That is, the average particle size of the second segregations 11c is calculated by determining at least five second segregations 11c in the above-mentioned manner and thereafter measuring equivalent circle diameters of the second segregations 11c with image analysis.

Preferably, the second segregations 11c are present inside the ceramic layers 10. "inside the ceramic layers 10" means that the second segregations 11c are not in direct contact with the internal electrode layers 12, but are present so as to be surrounded by the dielectric particles 11a. However, a part of the second segregations 11c may be present in the boundaries 20 so as to be in contact with the internal electrode layers 12. Preferably, the number N2 of second segregations 11c contained in a unit cross-sectional area of the ceramic layers 10 is 0.002 pieces/$\mu m^2$ to 1 pieces/$\mu m^2$. The number N2 is calculated by performing the above-mentioned mapping analysis in a plurality of visual fields and dividing the number of determined second segregations 11c by a total area of the measurement visual fields.

In addition to the first segregations 11b and the second segregations 11c, preferably, the ceramic layers 10 according to the present embodiment include third segregations 11e having predetermined characteristics. The third segregations 11e are phases of a composite oxide whose Si concentration is higher than that in the dielectric particles 11a. Then, the third segregations 11e include at least Ba, Ti, Si, and O and may further include constituent elements of the ceramic layers 10. The detailed composition of the third segregations 11e is not limited, but can be, for example, $Ba_2TiSi_2O_8$.

As with the first segregations 11b, preferably, the third segregations 11e are determined by a combination of mapping analysis and point analysis with EDX or WDS. For example, a mapping analysis is performed in a cross section of the element body 4 as shown in FIG. 2, and regions whose Si concentration is higher than that in the dielectric particles 11a (Si segregation regions) are extracted from the obtained Si mapping image. Then, a point analysis is performed for the extracted regions. When Ba, Ti, Si, and O are detected by this analysis, the Si segregation regions are determined as the third segregations 11e according to the present embodiment.

The third segregations 11e can have an average particle size of 2 μm or less and preferably have an average particle size of 0.05 μm to 1 μm. The average particle size of the third segregations 11e is measured in the same manner as the other segregations (11b, 11c).

The third segregations 11e are preferably present inside the ceramic layers 10 and may partially be present in the boundaries 20 so as to be in contact with the internal electrode layers 12. Preferably, the number N3 of third segregations 11e contained in a unit cross-sectional area of the ceramic layers 10 is 0.003 pieces/$\mu m^2$ to 0.3 pieces/$\mu m^2$.

The number N3 is calculated by performing the above-mentioned mapping analysis in a plurality of visual fields and dividing the number of determined third segregations 11e by a total area of the measurement visual fields.

The grain boundaries 11d existing between the dielectric particles 11a are composed of constituent elements of the main component and sub-component elements. Other segregation phases (segregation phases other than 11b, 11c, and 11e) due to the sub-components may be present in the grain boundaries 11d. In addition to the dielectric particles 11a and the segregation phases mentioned above, voids and secondary-phase particles may be present in the ceramic layers 10.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

For example, the dielectric paste is produced in the following manner. First, dielectric raw materials are uniformly mixed, for example, in wet manner and dried. Then, a heat treatment is performed with predetermined conditions to obtain a calcined powder. A known organic vehicle or a known water-based vehicle is added to the obtained calcined powder and kneaded to prepare a dielectric paste. If necessary, the dielectric paste may contain additives selected from various dispersants, plasticizers, dielectrics, sub-component compounds, glass frits, and the like.

When the second segregations 11c and the third segregations 11e are formed in the ceramic layers 10, a second-segregation raw material powder and a third-segregation raw material powder are added to the above-mentioned dielectric paste. For example, the second-segregation raw material powder is obtained by mixing a $MgCO_3$ powder, a $BaCO_3$ powder, and a $TiO_2$ powder at a predetermined proportion, mixing the mixture, and appropriately pulverizing it. Likewise, the third-segregation raw material powder is obtained by mixing a $BaCO_3$ powder, a $TiO_2$ powder, and a $SiO_2$ powder at a predetermined proportion, mixing the mixture, and appropriately pulverizing it. Then, the prepared second-segregation raw material powder and third-segregation raw material powder are mixed with a vehicle together with the above-mentioned calcined powder of the dielectric raw materials to prepare the dielectric paste.

Meanwhile, the internal-electrode paste is prepared by kneading a conductive powder (preferably, Ni powder or Ni alloy powder) made of a conductive metal or an alloy thereof, a first-segregation raw material powder, and a known binder or solvent. The first-segregation raw material powder added at this time is obtained by mixing a $BaCO_3$ powder and a $V_2O_5$ powder at a predetermined proportion, mixing the mixture, and appropriately pulverizing it. The first segregations 11b can be present in the boundaries 20 by adding the first-segregation raw material powder into the internal-electrode paste.

If necessary, the internal-electrode paste may include a ceramic powder (e.g., barium titanate powder) as an inhibitor. The inhibitor exhibits a reduction effect on the sintering of the conductive powder in the firing step.

Next, the dielectric paste is turned into sheets by, for example, a doctor blade method to obtain ceramic green sheets. Then, the internal-electrode paste is applied onto the ceramic green sheets in a predetermined pattern by various printing methods, such as screen printing, or a transfer method. Moreover, the green sheets with the internal electrode patterns are laminated and thereafter pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned process is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, the green chips are put into a barrel container together with a medium and a polishing liquid, and a rotational movement or vibration is applied to the barrel container. Due to this barrel polishing, unnecessary parts, such as burrs, generated during the cutting are polished, and the corners of the green chips become rounded (corner R). The green chips after the barrel polishing are washed with a cleaning solution, such as water, and dried.

Next, the green chips obtained above are subjected to a binder removal treatment and a firing treatment to obtain the element body 4.

The conditions for the binder removal treatment are not limited and are appropriately determined based on the main component composition of the ceramic layers 10 and the main component composition of the internal electrode layers 12. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment are not limited and are appropriately determined based on the main component composition of the ceramic layers 10 and the main component composition of the internal electrode layers 12. For example, the holding temperature during firing is preferably 1200-1350° C. and is more preferably 1220-1300° C., and the holding time is preferably 0.5-8 hours and is more preferably 1-3 hours. The firing atmosphere is preferably a reducing atmosphere, and for example, a mixed gas of $N_2$ and $H_2$ can be humidified and used as the atmospheric gas. When the internal electrode layers 12 are made of a base metal of Ni, Ni alloy, etc., the oxygen partial pressure in the firing atmosphere is preferably $1.0 \times 10^{-14}$ to $1.0 \times 10^{-10}$ MPa.

After the firing treatment, if necessary, an annealing may be performed. The annealing is a treatment for reoxidizing the ceramic layers 10. When the firing treatment is carried out in a reducing atmosphere, the annealing is preferably performed. The conditions for the annealing treatment are not limited and are also appropriately determined based on the main component composition of the ceramic layers 10 and the like. For example, the holding temperature is preferably 950-1150° C., the temperature holding time is preferably 0-20 hours, and the heating rate and the cooling rate are preferably 50-500° C./hour. Preferably, a humidified $N_2$ gas or the like is used as the atmospheric gas, and the oxygen partial pressure in the annealing atmosphere is $1.0 \times 10^{-9}$ to $1.0 \times 10^{-5}$ MPa.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, a pair of external electrodes 6 is formed on the outer surface of the element body 4 obtained above. The external electrodes 6 are formed by any method. For example, when baked electrodes are formed as the external electrodes 6, a conductive paste containing glass frits is applied to the end surfaces of the element body 4 by a dip method, and the element body 4 is thereafter heated at a predetermined temperature. When resin electrodes are formed as the external electrodes 6, a conductive paste containing a thermosetting resin is applied to the end surfaces of the element body 4, and the element body 4 is thereafter heated at a temperature at which the thermosetting resin is cured. After the baked electrodes or the resin electrodes are formed in the above-mentioned manner, sputtering, vapor deposition, electrolytic plating, electroless plating, or the like may be performed so as to form the external electrodes 6 having a multilayer structure.

After the above-mentioned process, the multilayer ceramic capacitor 2 including the external electrodes 6 is obtained.

SUMMARY OF EMBODIMENT

The multilayer ceramic capacitor 2 according to the present embodiment has a structure in which the ceramic layers 10 including a perovskite compound represented by $ABO_3$ as a main component and the internal electrode layers 12 are laminated alternately. Then, the first segregations 11b containing at least Ba, V, and O are present in the ceramic layers 10. Moreover, a Ba/Ti ratio (molar ratio) in the first segregations 11b is 1.20 or more.

Since the multilayer ceramic capacitor 2 has the above-mentioned characteristics, the insulation resistance is less likely to decrease in a high-temperature and high-humidity environment, and the durability for a high-temperature and high-humidity environment is improved. In particular, since the first segregations 11b are present in the boundaries 20 between the ceramic layers 10 and the internal electrode layers 12, the above-mentioned effect of improving the durability becomes remarkable. The reason why the durability is improved is not necessarily clear, but it is considered that the improvement in durability is due to the improvement in joint strength between the ceramic layers 10 and the internal electrode layers 12 by the first segregations 11b containing predetermined elements.

Generally, material characteristics, such as shrinkage rate and linear expansion coefficient, are different from each other between ceramic layers composed of dielectric ceramics and internal electrode layers composed of Ni, and peeling of the internal electrode layers and cracks in the ceramic layers are likely to occur due to this difference in characteristics. In the multilayer ceramic capacitor 2 according to the present embodiment, the first segregations 11b existing in the boundaries 20 are a composite oxide containing Ba and are thereby considered to have characteristics for easy joint with the dielectric particles 11a containing barium titanate (BT). Moreover, V, which is contained in the first segregations 11b, is harder to oxidize than Ba but easier to oxidize than Ni and is thereby considered to exist between Ni (metal) and BT and strengthen their joint.

As mentioned above, the first segregations 11b have a high affinity for both of the dielectric particles 11a of the ceramic layers 10 and Ni of the internal electrode layers 12, and the existence of the first segregations 11b in the boundaries 20 is considered to improve the joint strength between the ceramic layers 10 and the internal electrode layers 12. As a result, the multilayer ceramic capacitor 2 according to the present embodiment is considered to prevent the peeling of the internal electrode layers 12 and the generation of cracks in the ceramic layers 10 and improve the durability for a high-temperature and high-humidity environment.

In particular, in the present embodiment, the number N1 of first segregations 11b contained in a unit length of the boundaries 20 is 0.004 pieces/μm or more, and this feature is considered to further improve the joint strength between the ceramic layers 10 and the internal electrode layers 12. As a result, the durability for a high-temperature and high-humidity environment can be further improved.

In the present embodiment, the first segregations 11b have an average particle size D1 of 0.2 μm or more and 2.0 μm or less, and the ratio (D1/$T_E$) is 0.50 or more. In this feature, the first segregations 11b are easily present in the boundaries 20, and it is possible to more favorably prevent the peeling of the internal electrode layers 12 and the generation of cracks in the ceramic layers 10. As a result, the durability for a high-temperature and high-humidity environment can be further improved.

In the multilayer ceramic capacitors 2 according to the present embodiment, the second segregations 11c and/or the third segregations 11e having predetermined characteristics are present inside the ceramic layers 10. The segregation phases (11c, 11e) are considered to have a function of further improving the sintering density of the element body 4. The inclusion of these segregation phases in the ceramic layers 10 can further improve the durability for a high-temperature and high-humidity environment.

Hereinbefore, an embodiment of the present invention is explained, but the present invention is not limited to the above-mentioned embodiment and can be modified variously without departing from the gist of the present invention.

In the present embodiment, for example, the multilayer ceramic capacitor 2 is exemplified as the multilayer ceramic electronic device, but the multilayer ceramic electronic device of the present invention may be, for example, bandpass filters, multilayer three-terminal filters, piezoelectric elements, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

Example 1

In Example 1, a multilayer ceramic capacitor 2 shown in FIG. 1 was manufactured in the following manner.

First, a dielectric paste and an internal-electrode paste were prepared. Specifically, the dielectric paste was produced by mixing a barium titanate powder ($BaTiO_3$ powder) to be a main component of ceramic layers 10, sub-component powders ($MgCO_3$ powder, $Al_2O_3$ powder, $Ho_2O_3$ powder, $V_2O_5$ powder, $CaCO_3$ powder, $MnCO_3$ powder, and $SiO_2$ powder), and an organic vehicle. The barium titanate powder (dielectric raw material powder) was produced by a hydrothermal synthesis method.

Meanwhile, the internal-electrode paste was produced by mixing a Ni powder, a first-segregation raw material powder, a barium titanate powder (inhibitor), a binder, and a solvent. At this time, the first-segregation raw material powder added to the internal-electrode paste was a Ba-V-O based composite oxide powder and obtained by mixing a $BaCO_3$ powder and a $V_2O_5$ powder at a predetermined proportion, calcining the mixture, and pulverizing it.

Next, green chips were manufactured by a sheet method using the dielectric paste and the internal-electrode paste mentioned above. Then, the green chips were subjected to a binder removal treatment, a firing treatment, and an annealing treatment to obtain an element body 4 having a size of L0×W0×T0=2.0 mm×1.25 mm×1.25 mm. In the element body 4, the lamination number of ceramic layers 10 sandwiched by the internal electrode layers 12 was 450, the average thickness of the ceramic layers 10 was 1 μm, and the average thickness $T_E$ of the internal electrode layers 12 was 0.8 μm.

Next, a baked electrode layer containing Cu, a Ni plating layer, a Sn plating layer were formed in this order on the outer surface of the element body 4 mentioned above. After the above-mentioned process, the capacitor samples according to Example 1 were obtained.

Example 2

In the production of the first-segregation raw material powder according to Example 2, the addition amount of the $BaCO_3$ powder was changed from that in Example 1. That is, in Example 2, the blending proportion in the production of raw material powders was controlled so that the Ba/Ti ratio in the first segregations 11b would be higher than that in Example 1. Except for the above, the experimental conditions according to Example 2 were the same as those in Example 1, and capacitor samples according to Example 2 were obtained.

Example 3

In Example 3, a first-segregation raw material powder (Ba-V-O based composite oxide) was added only to the dielectric paste, not to the internal-electrode paste. Except for the above, the experimental conditions according to Example 3 were the same as those in Example 1, and capacitor samples according to Example 3 were obtained.

Example 4

In Example 4, a dielectric paste was produced by mixing a barium titanate powder, a second-segregation raw material powder, sub-component powders ($MgCO_3$ powder, $Al_2O_3$ powder, $Ho_2O_3$ powder, $V_2O_5$ powder, $CaCO_3$ powder, $MnCO_3$ powder, and $SiO_2$ powder), and an organic vehicle. The second-segregation raw material powder added to the dielectric paste was a composite oxide powder represented by $Ba(Ti,Mg)O_3$ and obtained by mixing a $MgCO_3$ powder, a $BaCO_3$ powder, and a $TiO_2$ powder at a predetermined proportion, calcining the mixture, and pulverizing it. In Example 4, a first-segregation raw material powder was also added to the internal-electrode paste. Except for the above, the experimental conditions according to Example 4 were the same as those in Example 1, and capacitor samples according to Example 4 were obtained.

Example 5

In Example 5, a dielectric paste was produced by mixing a barium titanate powder, a third-segregation raw material powder, sub-component powders ($MgCO_3$ powder, $Al_2O_3$ powder, $Ho_2O_3$ powder, $V_2O_5$ powder, $CaCO_3$ powder, $MnCO_3$ powder, and $SiO_2$ powder), and an organic vehicle. The third-segregation raw material powder added to the dielectric paste was a Ba—Ti—Si—O composite oxide powder and obtained by mixing a $BaCO_3$ powder, a $TiO_2$ powder, and a $SiO_2$ powder at a predetermined proportion, calcining the mixture, and pulverizing it. In Example 5, a first-segregation raw material powder was also added to the internal-electrode paste. Except for the above, the experimental conditions according to Example 5 were the same as those in Example 1, and capacitor samples according to Example 5 were obtained.

Example 6

In Example 6, both of a second-segregation raw material powder and a third-segregation raw material powder were added to a dielectric paste, and capacitor samples according to Example 6 were obtained with the same conditions as in Examples 4 and 5.

Comparative Example 1

In Comparative Example 1, a dielectric paste and an internal-electrode paste were prepared without using segregation raw material powders. That is, the dielectric paste of Comparative Example 1 was prepared by mixing a barium titanate powder, a sub-component powder (the same sub-component as in Example 1), and an organic vehicle, and the internal-electrode paste of Comparative Example 1 was prepared by mixing a Ni powder, a barium titanate powder (inhibitor), a binder, and a solvent. Except for the above, the experimental conditions according to Comparative Example 1 were the same as those in Example 1, and capacitor samples according to Comparative Example 1 were obtained.

Comparative Example 2

In Comparative Example 2, a dielectric paste was obtained by mixing a barium titanate powder, a $V_2O_5$ powder, a sub-component powder (the same sub-component as in Example 1), and an organic vehicle. Meanwhile, an internal-electrode paste of Comparative Example 2 was the same paste as in Comparative Example 1 without adding segregation raw material powders. Except for the above, the experimental conditions according to Comparative Example 2 were the same as those in Example 1, and capacitor samples according to Comparative Example 2 were obtained.

The capacitor samples according to each Example and each Comparative Example manufactured in Experiment 1 were subjected to the following evaluations.

Analysis of Segregations

In Experiment 1, segregation phases existing in the boundaries 20 and segregation phases existing inside the ceramic layers 10 were determined by observing a cross section of each capacitor sample with STEM and performing a mapping analysis and a point analysis with WDS at that time. Table 1 shows the measurement results in each Example and each Comparative Example. Although not shown in Table 1, both of the second segregations 11c and the third segregations 11e according to Examples 4-6 were present inside the ceramic layers.

Durability Evaluation

A pressure cooker bias test (PCBT) was performed so as to evaluate the durability of the capacitor samples for a high-temperature and high-humidity environment. Specifically, the capacitor samples were exposed for a long time to an environment of temperature: 121° C., humidity: 95%, and atmospheric pressure: $2.026 \times 10^5$ Pa while voltage (6.3V) was being applied to the capacitor samples. The exposure time was 24 hours in Condition 1 and 240 hours in Condition 2 for evaluation of the durability under stricter conditions than Condition 1. Then, an insulation resistance of the capacitor samples was measured before and after the PCBT, and the sample in which the insulation resistance after the PCBT was reduced to 1/10 or less of the insulation resistance before the test was considered to be failed (NG). The number of test samples in Condition 1 was 80, and the number of test samples in Condition 2 was 400. A NG rate (number of NG samples/number of test samples (80 or 400)) in each Example and each Comparative Example was calculated. The NG rate in Condition 1 (PCBT 24 hours): 0/80 was used as a pass/fail criterion for durability. The lower the NG rate in Condition 2 was, the better the durability was considered to be. The evaluation results of Experiment 1 are shown in Table 1.

TABLE 1

| Sample No. | Manufacturing Conditions: Additives to Paste ※ common additives in all samples are omitted | | Analysis Results of Segregations | | | | | Evaluation Results of PCBT | |
|---|---|---|---|---|---|---|---|---|---|
| | | | First Segregations | | | | | Condition 1: 24 hours | Condition 2: 240 hours |
| | Dielectric Paste | Internal-Electrode Paste | Presence or Absence | Presence Location | Ba/Ti Ratio | Second Segregations | Third Segregations | NG Rate (NG Number/Test Number) | NG Rate (NG Number/Test Number) |
| Comp. Ex. 1 | — | — | absent | — | — | absent | absent | 3/80 | 16/400 |
| Comp. Ex. 2 | $V_2O_5$ | — | absent | — | — | absent | absent | 2/80 | 11/400 |
| Ex. 1 | — | Ba—V—O | present | boundaries | 1.21 | absent | absent | 0/80 | 1/400 |
| Ex. 2 | — | Ba—V—O | present | boundaries | 1.83 | absent | absent | 0/80 | 2/400 |
| Ex. 3 | Ba—V—O | — | present | inside ceramic | 1.92 | absent | absent | 0/80 | 9/400 |

TABLE 1-continued

| | Manufacturing Conditions: Additives to Paste | | Analysis Results of Segregations | | | | Evaluation Results of PCBT | |
| | ※ common additives in all samples are omitted | | First | | | | Condition 1: 24 hours | Condition 2: 240 hours |
| | | Internal- | | Segregations | | Second Third | NG Rate | NG Rate |
| Sample No. | Dielectric Paste | Electrode Paste | Presence or Absence | Presence Location | Ba/Ti Ratio | Segre- gations | Segre- gations | (NG Number/ Test Number) | (NG Number/ Test Number) |
|---|---|---|---|---|---|---|---|---|---|
| Ex. 4 | Ba(Ti, Mg)O₃ | Ba—V—O | present | layers boundaries | 1.50 | present | absent | 0/80 | 0/400 |
| Ex. 5 | Ba—Ti—Si—O | Ba—V—O | present | boundaries | 1.76 | absent | present | 0/80 | 0/400 |
| Ex. 6 | Ba-Ti—Si—O, Ba(Ti, Mg)O₃ | Ba—V—O | present | boundaries | 1.87 | present | present | 0/80 | 0/400 |

As shown in Table 1, in Comparative Examples 1 and 2, first segregations 11b containing V were not present, and a sufficient durability was not obtained. Meanwhile, in Examples 1-6 (first segregations 11b were present), the NG rate in the PCBT under Condition 1 was 0/80, and the durability for a high-temperature and high-humidity environment was further improved than in each Comparative Example. In Examples 1-6, cracks in the ceramic layers 10 and peeling of the internal electrode layers 12 were prevented more than in each Comparative Example, and the durability was thereby considered to improve.

Comparing the results of Examples 1-3, the durability in Examples 1 and 2 was more favorable than that in Example 3. This result indicates that the durability for a high-temperature and high-humidity environment was further improved by the existence of the first segregations 11b containing V in the boundaries between the ceramic layers 10 and the internal electrode layers 12.

Experiment 2

In Experiment 2, capacitor samples according to Examples 11-14 were obtained by changing the average particle size D1 of first segregations 11b. The average particle size of the first segregations 11b was controlled by pulverization conditions in the preparation for the first-segregation raw material powder. Except for the above, the experimental conditions in Experiment 2 were the same as those in Example 1 of Experiment 1, and the same evaluation as in Experiment 1 was performed. The evaluation results of Experiment 2 are shown in Table 2.

TABLE 2

| | First Segregations | | | Evaluation Results of PCBT | |
| | | | | Condition 1: 24 hours | Condition 2: 240 hours |
| Sample No. | Presence Location | Ba/Ti Ratio (—) | Average Particle Size D1 (μm) | NG Rate (NG Number/Test Number) | NG Rate (NG Number/Test Number) |
|---|---|---|---|---|---|
| Ex. 11 | boundaries | 1.33 | 0.16 | 0/80 | 2/400 |
| Ex. 12 | boundaries | 1.28 | 0.22 | 0/80 | 0/400 |
| Ex. 13 | boundaries | 1.62 | 1.80 | 0/80 | 0/400 |
| Ex. 14 | boundaries | 1.37 | 3.20 | 0/80 | 4/400 |

The results shown in Table 2 indicate that it was preferable for the first segregations 11b to have an average particle size D1 of 0.2 μm or more and 2.0 μm or less.

Experiment 3

In Experiment 3, capacitor samples according to Examples 21-23 were manufactured by changing $D1/T_E$. $D1/T_E$ was adjusted by controlling an average particle size D1 based on pulverization conditions in the preparation for the first-segregation raw material powder and an average thickness $T_E$ based on application conditions of the internal-electrode paste. Except for the above, the experimental conditions in Experiment 3 were the same as those in Example 1 of Experiment 1, and the same evaluation as in Experiment 1 was performed. The evaluation results of Experiment 3 are shown in Table 3.

TABLE 3

| | First Segregations | | | Evaluation Results of PCBT | |
| | | | | Condition 1: 24 hours | Condition 2: 240 hours |
| Sample No. | Presence Location | Ba/Ti Ratio (—) | $D1/T_E$ (—) | NG Rate (NG Number/Test Number) | NG Rate (NG Number/Test Number) |
|---|---|---|---|---|---|
| Ex. 21 | boundaries | 1.72 | 0.32 | 0/80 | 1/400 |
| Ex. 22 | boundaries | 1.48 | 0.52 | 0/80 | 0/400 |
| Ex. 23 | boundaries | 1.66 | 1.30 | 0/80 | 0/400 |

The results shown in Table 3 indicate that $D1/T_E$ was preferably 0.50 or more.

Experiment 4

In Experiment 4, capacitor samples according to Examples 31-33 were manufactured by changing the number N1 of first segregations 11b existing in a unit length of the boundaries 20. The number N1 was controlled by the addition amount of the first-segregation raw material powder added into the internal-electrode paste and measured by a cross-sectional analysis with STEM. Except for the above, the experimental conditions in Experiment 4 were the same as those in Example 1 of Experiment 1, and the same evaluation as in Experiment 1 was performed. The evaluation results of Experiment 4 are shown in Table 4.

TABLE 4

| | First Segregations | | | Evaluation Results of PCBT | |
| | | | | Condition 1: 24 hours NG Rate | Condition 2: 240 hours NG Rate |
|---|---|---|---|---|---|
| Sample No. | Presence Location | Ba/Ti Ratio (—) | Number N1 (pieces/μm) | (NG Number/Test Number) | (NG Number/Test Number) |
| Ex. 31 | boundaries | 1.69 | 0.0012 | 0/80 | 2/400 |
| Ex. 32 | boundaries | 1.84 | 0.0042 | 0/80 | 0/400 |
| Ex. 33 | boundaries | 1.90 | 0.0520 | 0/80 | 0/400 |

The results shown in Table 4 indicate that the number N1 of first segregations 11b existing in a unit length of the boundaries 20 was preferably 0.004 pieces/μm or more and 0.055 pieces/μm or less.

DESCRIPTION OF THE REFERENCE NUMERICAL

2 . . . multilayer ceramic capacitor
4 . . . element body
4a . . . end surface
4b . . . side surface
10 . . . ceramic layer
12 . . . internal electrode layer
20 . . . grain boundary
11a . . . dielectric particle
11b . . . first segregation
11c . . . second segregation
11e . . . third segregation
11d . . . grain boundary
6 . . . external electrode

What is claimed is:

1. A dielectric composition comprising:
dielectric particles each including a perovskite compound represented by $ABO_3$ as a main component; and
first segregations each including at least Ba, V, and O, wherein a molar ratio (Ba/Ti) of Ba to Ti detected in the first segregations is 1.20 or more.

2. The dielectric composition according to claim 1, wherein an average particle size of the first segregations is 0.2 μm or more and 2.0 μm or less.

3. The dielectric composition according to claim 1, further comprising a second segregation containing Mg.

4. The dielectric composition according to claim 1, further comprising a third segregation, wherein the third segregation comprises a Ba—Ti—Si—O based composite oxide.

5. The dielectric composition according to claim 1, wherein the perovskite compound comprises barium titanate.

6. The dielectric composition according to claim 1, wherein the first segregations are phases of a composite oxide having a concentration of V that is higher than a concentration of V in the dielectric particles.

7. The dielectric composition according to claim 1, wherein a molar ratio (Ba/Ti) of Ba to Ti in the dielectric particles is less than the molar ratio (Ba/Ti) of Ba to Ti in the first segregations.

8. The dielectric composition according to claim 1, wherein a molar ratio (Ba/Ti) of Ba to Ti in the dielectric particles is 1.1 or less.

9. A multilayer ceramic electronic device comprising an element body formed by alternately laminating a ceramic layer including a perovskite compound represented by $ABO_3$ as a main component and an internal electrode layer containing Ni,
wherein
the ceramic layer includes first segregations each containing at least Ba, V, and O, and
a molar ratio (Ba/Ti) of Ba to Ti detected in the first segregations is 1.20 or more.

10. The multilayer ceramic electronic device according to claim 9, wherein the first segregations are present so as to directly contact with the internal electrode layer in a boundary between the ceramic layer and the internal electrode layer.

11. The multilayer ceramic electronic device according to claim 7, wherein the number of first segregations contained in a unit length of the boundary is 0.004 pieces/μm or more.

12. The multilayer ceramic electronic device according to claim 9, wherein a ratio of an average particle size of the first segregations to an average thickness of the internal electrode layer is 0.50 or more.

13. The multilayer ceramic electronic device according to claim 9, wherein the ceramic layer further includes a second segregation containing Mg.

14. The multilayer ceramic electronic device according to claim 9, wherein
the ceramic layer further includes a third segregation, and
the third segregation comprises a Ba—Ti—Si—O based composite oxide.

15. The multilayer ceramic electronic device according to claim 9, wherein the perovskite compound comprises barium titanate.

16. The multilayer ceramic electronic device according to claim 9, wherein
the ceramic layer further includes dielectric particles each including the perovskite compound represented by $ABO_3$ as a main component, and
the first segregations are phases of a composite oxide having a concentration of V that is higher than a concentration of V in the dielectric particles.

17. The multilayer ceramic electronic device according to claim 9, wherein
the ceramic layer further includes dielectric particles each including the perovskite compound represented by $ABO_3$ as a main component, and
a molar ratio (Ba/Ti) of Ba to Ti in the dielectric particles is less than the molar ratio (Ba/Ti) of Ba to Ti in the first segregations.

18. The multilayer ceramic electronic device according to claim 9, wherein
the ceramic layer further includes dielectric particles each including the perovskite compound represented by $ABO_3$ as a main component, and
a molar ratio (Ba/Ti) of Ba to Ti in the dielectric particles is 1.1 or less.

* * * * *